(12) United States Patent  (10) Patent No.: US 8,919,035 B2
Schmidt  (45) Date of Patent: Dec. 30, 2014

(54) AGRICULTURAL APPLICATIONS OF A DOUBLE HELIX CONDUCTOR

(75) Inventor: David G. Schmidt, Poway, CA (US)

(73) Assignee: Medical Energetics Ltd, Galway (IE)

( * ) Notice: Subject to any disclaimer, the term of this patent is extended or adjusted under 35 U.S.C. 154(b) by 311 days.

(21) Appl. No.: 13/360,522

(22) Filed: Jan. 27, 2012

(65) Prior Publication Data

US 2013/0192129 A1  Aug. 1, 2013

(51) Int. Cl.
*A01G 7/04* (2006.01)
(52) U.S. Cl.
USPC .................................................. 47/1.3
(58) Field of Classification Search
USPC .................................................. 47/1.3
See application file for complete search history.

(56) References Cited

U.S. PATENT DOCUMENTS

| | | | | |
|---|---|---|---|---|
| 2,035,274 | A * | 3/1936 | Mougey | 174/29 |
| 3,066,295 | A | 11/1962 | Krause et al. | 343/874 |
| 3,760,812 | A * | 9/1973 | Timm et al. | 607/116 |
| 3,774,452 | A | 11/1973 | Tullos et al. | 73/418 |
| 4,266,532 | A | 5/1981 | Ryaby et al. | 128/1.5 |
| 4,439,702 | A | 3/1984 | Belikov et al. | 310/80 |
| 4,489,276 | A | 12/1984 | Yu | 324/338 |
| 4,832,051 | A * | 5/1989 | Jarvik et al. | 607/116 |
| 5,077,934 | A | 1/1992 | Liboff et al. | 47/1.3 |
| 5,079,458 | A | 1/1992 | Schuster | 310/12 |
| 5,173,669 | A * | 12/1992 | Manoly | 333/162 |
| 5,359,340 | A | 10/1994 | Yokota | 343/792 |
| 5,366,493 | A | 11/1994 | Scheiner et al. | 607/116 |
| 5,464,456 | A * | 11/1995 | Kertz | 47/1.3 |
| 5,654,723 | A | 8/1997 | Craven et al. | 343/742 |
| 5,819,467 | A * | 10/1998 | Zucker | 47/1.3 |
| 5,892,480 | A | 4/1999 | Killen | 343/385 |
| 5,909,165 | A | 6/1999 | Leupold | 335/210 |
| 5,954,630 | A | 9/1999 | Masaki et al. | 600/28 |
| 6,005,462 | A | 12/1999 | Myers | 335/220 |
| 6,169,523 | B1 | 1/2001 | Ploussios | 343/895 |
| 6,239,760 | B1 | 5/2001 | Van Voorhies | 343/742 |
| 6,300,920 | B1 | 10/2001 | Pertl et al. | 343/895 |
| 6,552,530 | B1 | 4/2003 | Vaiser et al. | 324/204 |
| 6,770,023 | B2 * | 8/2004 | Vaiser et al. | 600/13 |
| 6,921,042 | B1 | 7/2005 | Goodzeit et al. | 242/430 |
| 7,148,783 | B2 | 12/2006 | Parsche et al. | 336/225 |
| 7,154,368 | B2 | 12/2006 | Sweeney et al. | 336/229 |
| 7,375,449 | B2 | 5/2008 | Butterfield | 310/207 |
| 8,463,407 | B2 | 6/2013 | Bulkes et al. | 607/148 |
| 8,652,023 | B2 | 2/2014 | Schmidt | 600/13 |
| 8,653,925 | B2 | 2/2014 | Schmidt | 336/188 |
| 8,749,333 | B2 | 6/2014 | Schmidt | 336/73 |
| 2005/0121396 | A1 | 6/2005 | Kosakewich | 210/748 |
| 2008/0161884 | A1 | 7/2008 | Chandler et al. | 607/50 |
| 2008/0266203 | A1 | 10/2008 | Rossetto et al. | 345/895 |
| 2009/0206974 | A1 | 8/2009 | Meinke | 336/224 |
| 2010/0005711 | A1 | 1/2010 | McNeff | 47/1.4 |

(Continued)

FOREIGN PATENT DOCUMENTS

GB  479841  2/1938
GB  2480610  11/2011

(Continued)

*Primary Examiner* — Son T Nguyen
(74) *Attorney, Agent, or Firm* — Pillsbury Winthrop Shaw Pittman LLP

(57) ABSTRACT

An electrical system having an underlying structure resembling the double helix most commonly associated with DNA is used to produce useful electromagnetic fields for agricultural applications.

14 Claims, 4 Drawing Sheets

(56) References Cited

U.S. PATENT DOCUMENTS

| | | | |
|---|---|---|---|
| 2010/0057655 A1 | 3/2010 | Jacobson et al. | 706/45 |
| 2010/0179630 A1 | 7/2010 | Williams | 607/127 |
| 2012/0223800 A1 | 9/2012 | Schmidt | 336/229 |
| 2013/0211181 A1 | 8/2013 | Schmidt | 600/13 |
| 2013/0285782 A1 | 10/2013 | Schmidt | 336/73 |
| 2014/0097925 A1 | 4/2014 | Schmidt | 336/188 |
| 2014/0100412 A1 | 4/2014 | Schmidt | 600/13 |
| 2014/0218149 A1 | 8/2014 | Schmidt | 336/73 |

FOREIGN PATENT DOCUMENTS

| | | |
|---|---|---|
| WO | WO 2012/118971 | 9/2012 |
| WO | WO 2013/112810 | 8/2013 |
| WO | WO 2013/123009 | 8/2013 |

* cited by examiner

AGRICULTURAL APPLICATIONS OF A DOUBLE HELIX CONDUCTOR

RELATED APPLICATIONS

This application is related to U.S. patent application Ser. No. 13/213,604, entitled "Double Helix Conductor," and filed Aug. 19, 2011. The related application is hereby incorporated by reference into the present application in its entirety.

FIELD OF THE INVENTION

The invention relates to bodies structured as helically wound runners around which one or more conductive wires may be wound, electrical devices and/or systems configured to include such bodies, and the agricultural applications thereof.

BACKGROUND OF THE INVENTION

It is known that spirally wound electrical conductors exhibit certain electromagnetic properties and/or can be used to generate particular electromagnetic fields. For example, it is known that an electromagnetic coil may act as an inductor and/or part of a transformer, and has many established useful applications in electrical circuits. Applications of an electromagnetic coil may exploit the electromagnetic field that is created when, e.g., an active current source is operatively coupled to the coil.

SUMMARY

One aspect of the invention relates to an electrical system for promoting growth of a plant and/or other organisms. The system includes a body, one or more conductive wires, and a current source. The body includes two intertwined helically wound runners arranged in at least two complete revolutions per runner. A first runner is coupled to a second runner by struts. The body has a periphery. The body is installed around or near a plant. The first wire is carried by the first runner. The first wire is conductive. The current source is arranged to electrically couple with two leads of the first wire causing a first current through the first wire along the first runner. The current source is configured to cause the first current through the first wire such that an electromagnetic field is created in and around the body that promotes growth of the plant disposed within or near the periphery of the body.

One aspect of the invention relates to a method for promoting growth of a plant and/or other organisms. The method includes installing a body around or near a plant and supplying a current to the body such that an electromagnetic field is created within and near the body that causes promotion of growth of the plant within or near the body. The body includes two intertwined helically wound runners, a wire, and a current source. The two runners are arranged in at least two complete revolutions per runner. The first runner is coupled to the second runner by struts. The wire is carried by the first runner. The wire is conductive. The current source is arranged to electrically couple with two leads of the wire for supply of a current to the wire, causing the current through the wire along, at least, the first runner.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
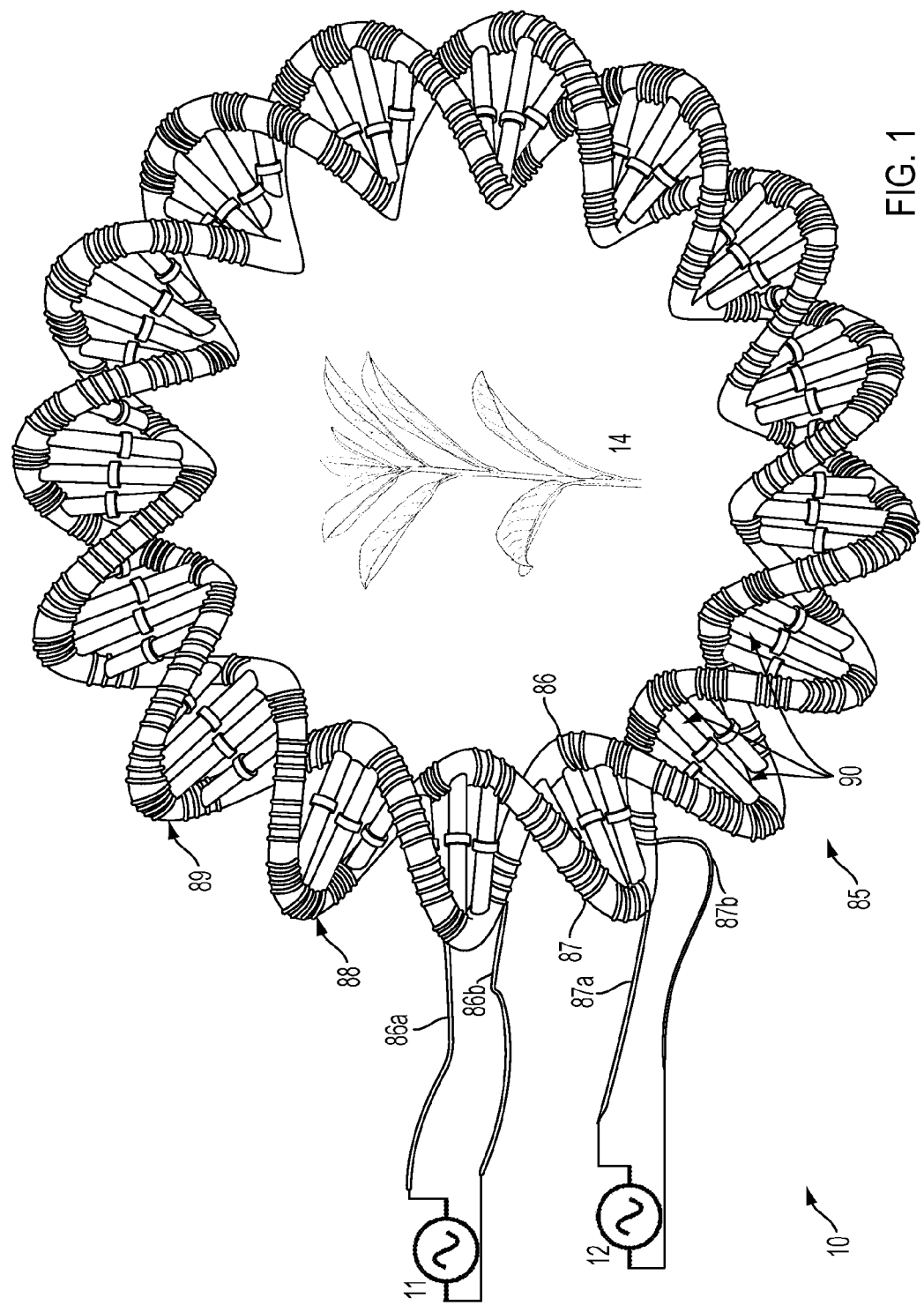
FIG. 1 schematically illustrates a system for promoting growth of a plant, according to one or more embodiments.

FIG. 1 illustrates a system 10 for promoting growth of a plant 14, according to one or more embodiments. System 10 includes a body 85, a first wire 86, a current source 11, and/or other components. The depiction of plant 14 as a single entity is not meant to be limiting. Plant 14 may include one or more plants and/or other organisms. For example, plant 14 may include an edible and/or commercial crop. In some embodiments, plant 14 may comprise (one or more types of) algae.

Body 85 of system 10 in FIG. 1 includes two intertwined helically wound runners—runner 88 and runner 89—sharing the same (circular) axis, coupled by struts 90 and having one or more conductive wires spirally wound around one or both runners. In other words, runner 88 and runner 89 of body 85 form cores around which wire 86 and wire 87 are spirally wound, respectively. As depicted in FIG. 1, body 85 includes two wires: wire 86 and wire 87. In some embodiments, system 10 includes one runner, three runners, and/or another number of runners.

Runner 88 and runner 89 of body 85 and system 10 in FIG. 1 are arranged in the shape of a three-dimensional curve similar to or substantially the same as a helix, bend with its ends arranged together. It is noted that the shape of body 85 resembles the general shape of DNA. The shape of the cross-section of a runner may include one or more of a circle, an oval, a square, a triangle, a rectangle, an angular shape, a polygon, and/or other shapes. The width and height of the cross-section of a runner may be limited for practical purposes. For example, for the purposes described herein, in some embodiments, it may be preferred arrange body 85 such that there is available space within the periphery of body 85, as shown, e.g., in FIG. 1. As depicted in FIG. 1, the shape of the cross-section of runner 88 and runner 89 is a circle. Note that embodiments of this disclosure are not intended to be limited by any of the given examples.

Runner 88, runner 89 and/or struts 90 of system 10 in FIG. 1 may be manufactured from one or more of plastic, plastic plated with metals including copper, nickel, iron, soft iron, nickel alloys, and/or other metals and alloys, and/or other materials. In some embodiments, runner 88, runner 89 and struts 90 are manufactured from non-conductive material. Runner 88, runner 89, and struts 90 may be manufactured from different materials. Runner 88, runner 89, and struts 90 may be manufactured through integral construction or formed separately prior to being assembled. The preceding statement is not intended to limit the (process of) manufacture of bodies similar to or substantially the same as body 85 in any way.

Referring to FIG. 1, wire 86 and wire 87, as any wire listed in any figure included in this description, may be insulated, uninsulated, or partially insulated and partially uninsulated.

The shape of body 85 of system 10 in FIG. 1 may be generally toroidal. In some embodiments, the body of system 10 may be arranged in any planar shape, including circular, polygonal, and/or other shapes. Alternatively, and/or simultaneously, a body such as body 85 may be arranged in a three-dimensional curve (a.k.a. space curve). Runner 88 and runner 89 of body 85 may form cores around which wire 86 and wire 87 are spirally wound, respectively. As such, wire 86 and wire 87 may be arranged in a helical shape having axes that coincide with runner 88 and runner 89, respectively. As shown in FIG. 1, wire 86 and 87 may be wound such that they go around any of struts 90 of body 85 and/or around any points of engagement between one of struts 90 and one of runners 88 and 89. The number of wire turns per complete revolution of a runner and/or the number of wire turns between adjacent struts may be characteristic measurements/ features of body 85. In FIG. 1, wire 86 and wire 87 are arranged to make approximately three to five turns between adjacent struts associated with runner 88 and runner 89, respectively, and/or some other number of turns. The depiction of FIG. 1 is intended to be exemplary, and in no way limiting.

Wire 86 may include two leads—lead 86a and lead 86b. Wire 87 may include two leads—lead 87a and lead 87b. In system 10, body 85 is electrically coupled with one or more power sources and/or current sources, such as, e.g., current source 11 and/or a current source 12, arranged such that electrical coupling with one or both of wire 86 and wire 87 may be established, e.g. through coupling of current source 11 with lead 86a and 86b of wire 86 and through coupling of current source 12 with lead 87a and 87b of wire 87. The current supplied to wire 86 may be a direct current or an alternating current. The current supplied to wire 87 may be a direct current or an alternating current. The currents supplied to wire 86 and wire 87 may flow in the same direction or the opposite direction.

For alternating currents, operating frequencies ranging from 0 Hz to 100 GHz are contemplated. Operating currents ranging from 1 pA to 10 A are contemplated. Operating voltages ranging from 1 mV to 20 kV are contemplated. In some embodiments, a root mean square voltage of about 12 V is supplied to wire 86. In a preferred embodiment, the frequency of the alternating current supplied to wire 86 is between 0 Hz and 20 kHz. In some embodiments, the current is less than about 1 pA, 1 nA, 1 mA, 100 mA, 250 mA, 500 mA, and/or other amounts of current. The operating frequencies for wire 86 and wire 87 may be the same or different. Other electrical operating characteristics of current supplied to wire 86 and wire 87, such as phase, may be the same or different. System 10 may be used to exploit the electromagnetic field that is created in and/or around body 85 when electrical power is supplied to one or more wires of body 85. The electromagnetic field promotes growth of a plant 14 disposed within or near the periphery of body 85.

Some embodiments of an electrical system including a body similar to or substantially the same as body 85 in FIG. 1, thus including wire 86 and wire 87, may be configured to have a current in wire 86 flowing in the opposite direction as the current in wire 87. In some embodiments the current supplied to one wire may be a direct current, whereas the current supplied to another wire may be an alternating current.

In some embodiments, system 10 may include multiple bodies similar to or substantially the same as body 85. Currents for these multiple bodies may be supplied by one or more power sources and/or current sources.

In some embodiments, the shape of body 85 of system 10 is arranged around and/or near multiple plants and/or other organisms. For example, system 10 may be configured and arranged to encompass a petri dish, a planter, a (photo)bioreactor, a growing tank, a row of planted crops, a green house, a field of plants, and/or any other conventionally used arrangement to grow plants. Consequently, body 85 may be configured such that the dimensions of the available space within the periphery of body 85 has predetermined dimensions. In some embodiments, the predetermined dimension includes a diameter of 1 inch, 1 foot, 3 feet, 6 feet, and/or another suitable dimension.

Figure 2:
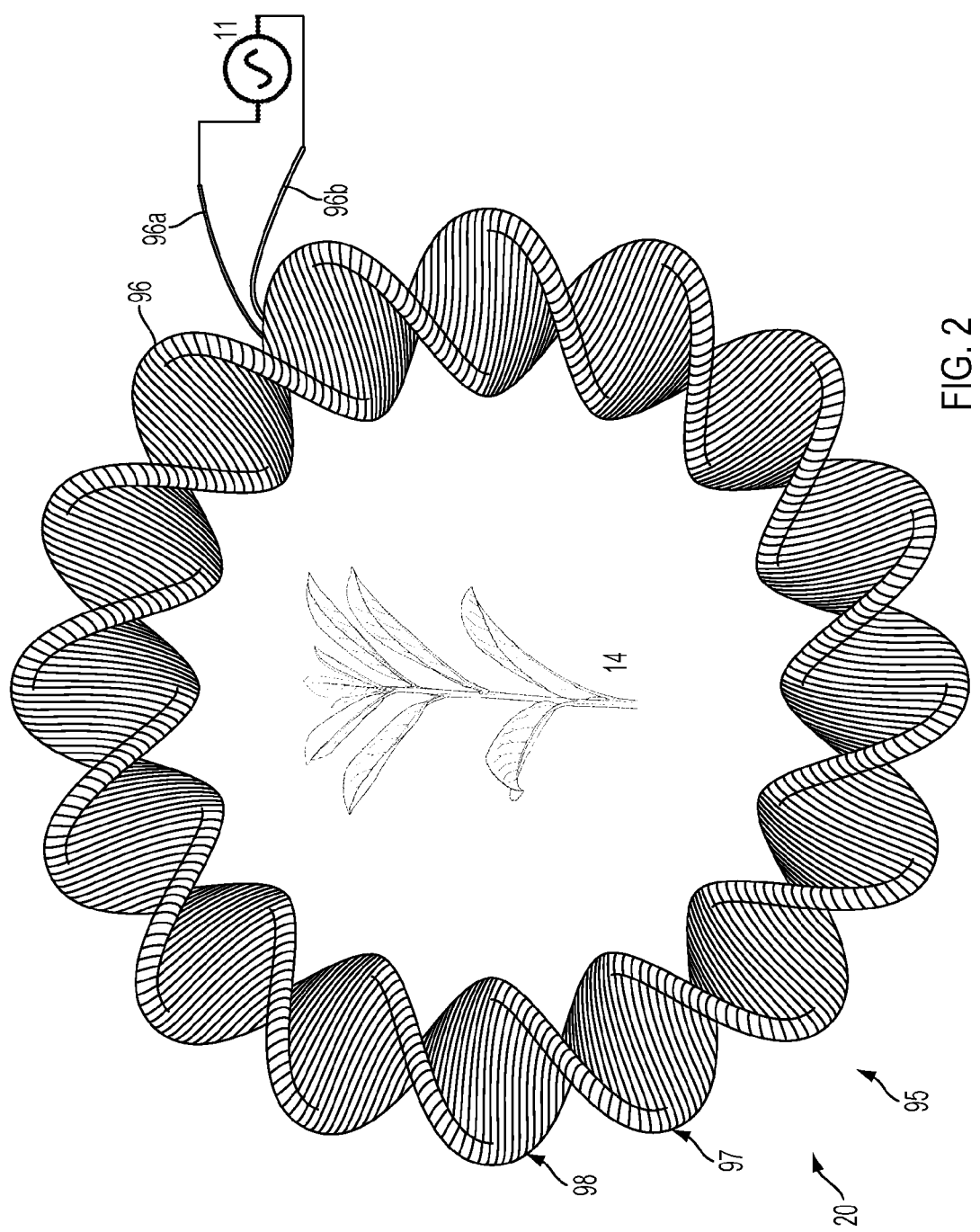
FIG. 2 schematically illustrates a system for promoting growth of a plant, according to one or more embodiments.

FIG. 2 illustrates a system 20 for promoting growth of plant 14, according to one or more embodiments. System 20 includes a body 95, a wire 96, current source 11, and/or other components. The depiction of plant 14 as a single entity is not meant to be limiting. Plant 14 may include one or more plants and/or other organisms. For example, plant 14 may include an edible and/or commercial crop. In some embodiments, plant 14 may comprise one or more types of algae and/or phytoplankton. For example, plant 14 may comprise (edible) seaweed, Spirulina, *Chlorella*, and/or types of algae suitable for the production of biodiesel and/or biofuel.

Body 95 of system 20 in FIG. 2 includes two intertwined helically wound runners—runner 97 and runner 98—sharing the same circular axis. Both runners are coupled by struts. Wire 96 is spirally wound around both runners of body 95. In some embodiments, system 20 includes one runner, three runners, and/or another number of runners. Wire 96 may be insulated, uninsulated, or partially insulated and partially uninsulated. Wire 96 may include two leads—lead 96a and lead 96b. The resulting shape of body 95 with wire 96 may be referred to as a helicoidal shape. In system 20, body 95 is electrically coupled with one or more power sources and/or current sources, such as, e.g., current source 11, arranged such that electrical coupling with wire 96 may be established, e.g. through coupling of current source 11 with lead 96a and 96b of wire 96. The current supplied to wire 96 may be a direct current or an alternating current. The runners of system 20 may be similar to or substantially the same as the runners of system 10 in FIG. 1.

For alternating currents in system 20, operating frequencies ranging from 0 Hz to 100 GHz are contemplated. Operating currents ranging from 1 pA to 10 A are contemplated. Operating voltages ranging from 1 mV to 15 kV are contemplated. In some embodiments, the operating voltage is matched to the membrane potential of a particular plant cell. In some embodiments, a root mean square voltage of about 12 V is supplied to wire 96. In a preferred embodiment, the frequency of the alternating current supplied to wire 96 is between 0 Hz and 20 kHz. In some embodiments, the current is about 1 pA, 1 nA, 1 mA, 50 mA, 100 mA, 250 mA, 500 mA, and/or other amounts of current. System 20 may be used to exploit the electromagnetic field that is created in and/or around body 95 when electrical power is supplied to one or more wires of body 95. The electromagnetic field promotes growth of a plant 14 disposed within or near the periphery of body 95.

In some embodiments, system 20 may include multiple bodies similar to or substantially the same as body 95. Currents for these multiple bodies may be supplied by one or more power sources and/or current sources. In some embodiments, a system may include a combination of one or more bodies similar to or substantially the same as body 85 and one or more bodies similar to or substantially the same as body 95.

Figure 4:
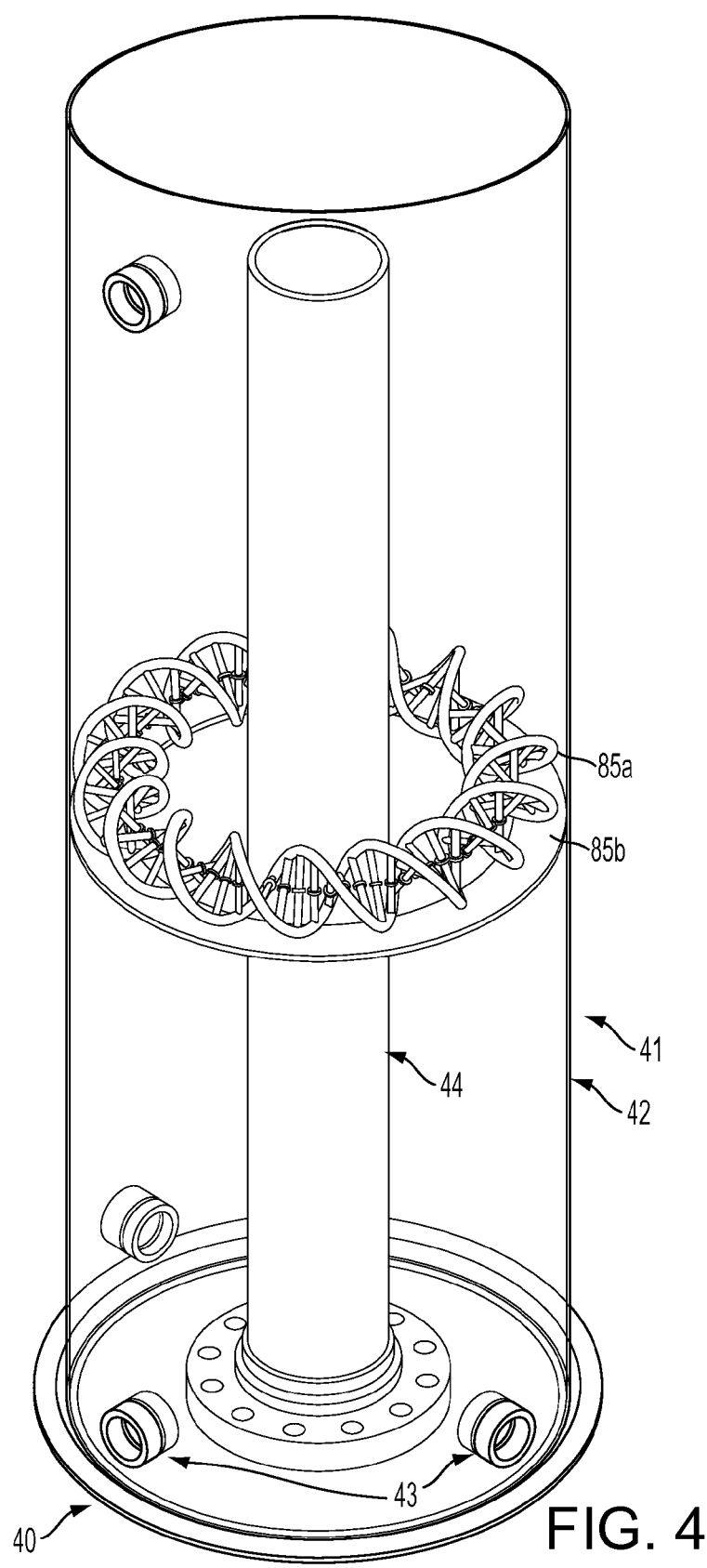
FIG. 4 illustrates a system for promoting growth of certain plants, according to one or more embodiments.

FIG. 4 illustrates a system 40 for promoting growth of certain plants, according to one or more embodiments. In particular, system 40 may be used to promote growth of plants that can thrive while submerged in water and/or move with fluids in motion, such as, e.g., algae. System 40 may include a tank 41, a hull 42, one or more ports 43, an inner pipe 44, helical coil 85*a*, support member 85*b*, and/or other components. Helical coil 85*a* may be held in place within tank 41 and/or physically supported by support member 85*b*. For example, support member 85*b* may comprise a shelf. Pumps (not depicted) may be used to circulate fluids within tank 41 of system 40. For example, one or more pumps may be operatively engaged with system 40 through one or more ports 43. The pumps may move fluid and plants up near the periphery of hull 42 and back down through inner pipe 44, and/or vice versa. Note that hull 42 may be taller than inner pipe 44 to accommodate this circulation. In some embodiments, the height of system 40 may range from about 3 feet to about 10 feet, and/or other suitable dimensions. System 40 may include one or more light sources (not depicted in FIG. 4) to, e.g., promote growth of the plants within tank 41. In some embodiments, one or more light sources may be embedded in one or more of the elements depicted in FIG. 4. For example, the bottom of tank 41 may comprise one or more light sources.

As part of the circulation, fluid and plants may be moved through the center of helical coil 85*a*, which may be similar to the body 85 depicted in FIG. 1. In some embodiments, system 40 may include a protective shell (not depicted in FIG. 4) so that fluids and/or plants do not directly come in contact with helical coil 85. System 40 may include wires (not depicted in FIG. 4) and one or more current sources (not depicted in FIG. 1) configured to create a particular electromagnetic field in and/or around helical coil 85*a* in a way that is similar to the described functionality of system 10 in FIG. 1. The orientation of system 40 is not intended to be limited to the exemplary embodiment depicted in FIG. 4. For example, tank 41 may be placed vertically, horizontally, and/or diagonally. The angle of tank 41 may be adjusted to allow maximum exposure to a light source, such as, e.g., the sun. In some embodiments, multiple tanks similar to tank 41 may be arranged and/or controlled in a coordinated fashion. The use of a helical coil in a larger body of water, such as, e.g., a lake, is contemplated, with and/or without the use of pumps to move the water through the helical coil.

Applications for any of the described systems herein, such as, e.g., system 10 and system 20, herein may include affecting growth and/or growth rate of plants and/or other organisms. For example, a particular type of plant may have a typical growth rate, or range of typical growth rates, under growing conditions that lack a significant electromagnetic field. For the purposes of this description, a significant electromagnetic field may be determined as an electromagnetic field of at least a predetermined threshold level of tesla. The predetermined threshold may be 1 pT, 1 nT, 1 mT, 10 mT, 100 mT, and/or another threshold. Using any of the electrical systems described herein, the growth rate, or range of typical growth rates, of the particular type of plant may be increased to a higher growth rate, or higher range of growth rates, for the particular plant. A unit of growth rate may be inch/day, or another unit expressing some length, area, volume, or size per unit of time, and/or another appropriate unit. For some embodiments, such as e.g. an embodiment using algae or suitable similar plants, growth rate may be expressed though lipid production rate, starch content production rate, biomass content production rate.

For example, a specific type of plant may have a typical maximum growth level, under growing conditions that lack a significant electromagnetic field. Using any of the electrical systems described herein, the maximum growth level, or range of typical maximum growth levels, of the specific type of plant may be increased to a higher maximum growth level, or higher range of maximum growth levels, for the specific plant. Maximum growth level may be expressed in inches, square inches, liters, kilograms, lipid content, and/or another unit expressing some length, area, volume, weight, or size, and/or another appropriate unit.

For example, a particular type of plant may have a typical maximum yield, under growing conditions that lack a significant electromagnetic field. Using any of the electrical systems described herein, the maximum yield, or range of typical maximum yields, of the particular type of plant may be increased to a higher maximum yield, or higher range of maximum yields, for the particular plant. Maximum yield may be expressed in volume or weight per area and/or period, such as kilogram/square feet, or pounds per acre per week, and/or other units as appropriate.

In some embodiments, an application for any of the described systems may exploit an improved and/or increased level of protein biosynthesis for organisms exposed to an electromagnetic field created by, e.g., system 10 or system 20.

Figure 3:
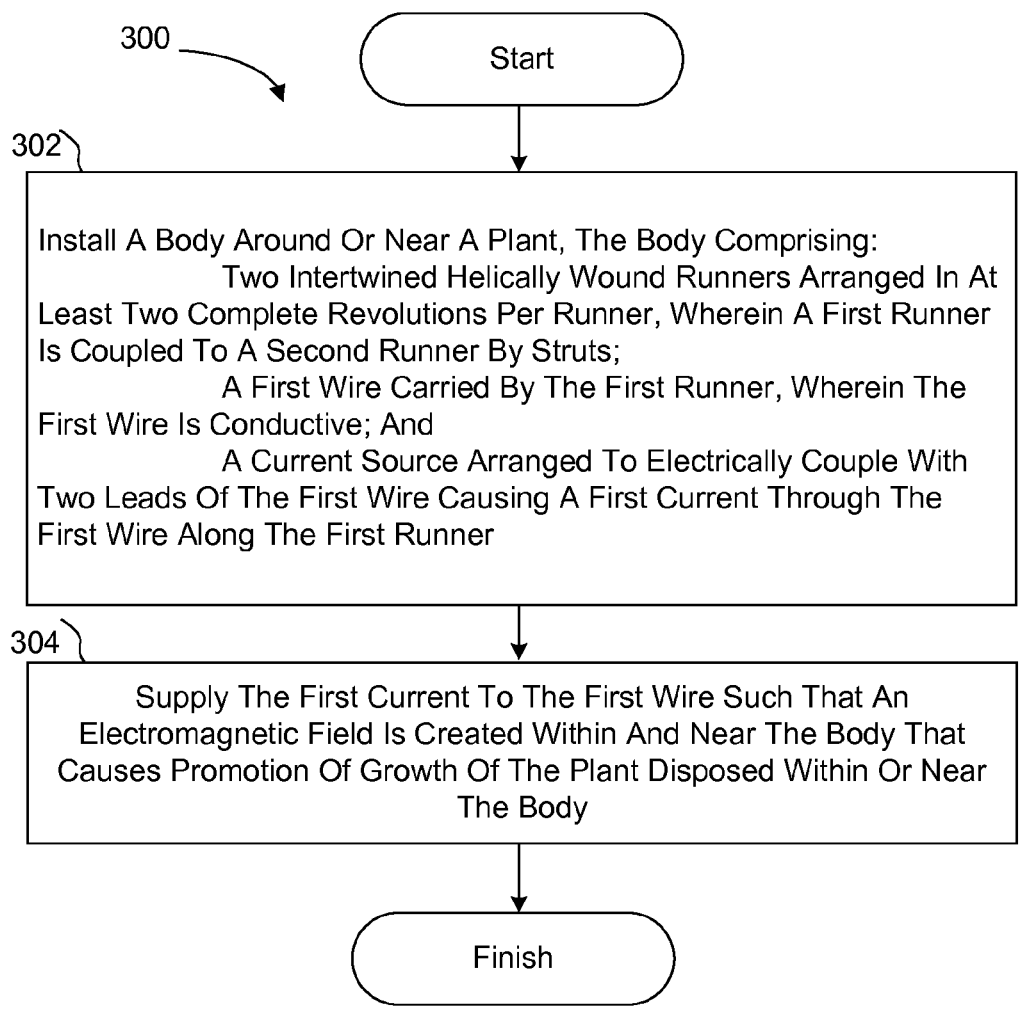
FIG. 3 illustrates a method for promoting growth of a plant, according to one or more embodiments.

FIG. 3 illustrates a method 300 for promoting growth of a plant. The operations of method 300 presented below are intended to be illustrative. In certain embodiments, method 300 may be accomplished with one or more additional operations not described, and/or without one or more of the operations discussed. Additionally, the order in which the operations of method 300 are illustrated in FIG. 3 and described below is not intended to be limiting.

In certain embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a body is installed around or near a plant. The body includes two intertwined helically wound runners, a conductive wire, and a current source. The runners are arranged in at least two complete revolutions per runner, wherein the first runner is coupled to the second runner by struts. The wire is carried by the first runner. The current source is arranged to electrically coupled with two leads of the wire causing a current through the wire along the first runner. In one embodiment, operation 302 is performed by a user of system 10 (shown in FIG. 1 and described above).

At an operation 304, a current is supplied to the wire such that an electromagnetic field is created within and near the body that causes promotion of growth of the plant disposed within or near the body. In one embodiment, operation 304 is performed by a current source similar to or substantially the same as current source 11 (shown in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electrical system for promoting growth of a plant, the system comprising:
    a body including two intertwined helically wound runners arranged in at least two complete revolutions per runner, wherein a first runner is coupled to a second runner by struts, wherein the first runner has a first helical shape, wherein the second runner has a second helical shape, wherein the first runner and the second runner are arranged in a shape of a double helix, wherein the body has a periphery, wherein the body is installed around or near a plant;
    a first wire carried by and spirally wound around the first runner, wherein the first wire is conductive;
    a second wire carried by and spirally wound around the second runner, wherein the second wire is conductive; and one or more current sources arranged to electrically couple with two leads of the first wire causing a first current through the first wire along the first runner, wherein the one or more current sources provide the first current through the first wire such that an electromagnetic field is created and around the body that promotes growth of the plant disposed within or near the periphery of the body, wherein the one or more current sources are arranged to electrically couple with two leads of the second wire causing a second current through the second wire along the second runner, wherein the one or more current sources provide the second current through the second wire such that the electromagnetic field is modified.

2. The system of claim 1, wherein the one or more current sources provide the first current such that the first current is an alternating current, wherein the alternating current has one or more frequencies between 0 Hz and 20 kHz, and wherein the alternating current is less than about 250 mA.

3. The system of claim 1, wherein the one or more current sources provide the first current such that the first current is an alternating current having one or more frequencies in a range of human-perceptible auditory sensitivity.

4. The system of claim 1, wherein the current source provides the first current by supplying a root mean square voltage of about 12 V to the two leads of the first wire.

5. The system of claim 1, wherein the first current and the second current flow in a similar direction.

6. The system of claim 1, wherein the first current and the second current flow in a dissimilar direction.

7. The system of claim 1, wherein the plant comprises plants that thrive while being submerged, the system further comprising a tank configured to contain fluid within which plants are submerged, wherein the body is arranged within or near the tank such that the created electromagnetic field promotes growth of the plants within the fluid contained in the tank.

8. A method for promoting growth of a plant, the method comprising:
    installing a body around or near a plant, the body comprising:
        two intertwined helically wound runners coupled by struts and arranged in at least two complete revolutions per runner, wherein the two intertwined helically wound runners include a first runner and a second runner, wherein the first runner has a first helical shape, wherein the second runner has a second helical shape, wherein the first runner and the second runner are arranged in a shape of a double helix;
        a first wire carried by the first runner wherein the first wire is conductive, the first wire being spirally wound around the first runner; a second wire carried by the second runner, wherein the second wire is conductive, the second wire being spirally wound around the second runner; and coupling one or more current sources to the first wire and to the second wire; supplying, by the one or more current sources, a first current to the first wire such that an electromagnetic field is created within and near the body that causes promotion of growth of the plant disposed within or near the body; and supplying, by the one or more current sources, a second current to the second wire along the second runner such that the electromagnetic field is modified.

9. The method of claim 8, wherein the first current through the first wire is an alternating current having one or more frequencies between 0 Hz and 20 kHz.

10. The method of claim 8,
    wherein the first current and the second current are alternating currents that flow in a similar direction.

11. The method of claim 8,
    wherein the first current and the second current are alternating currents that flow in a dissimilar direction.

12. The method of claim 8, further comprising:
    promoting, through the electromagnetic field, growth of the plant to a faster growth rate than a typical growth rate, wherein the plant has a typical growth rate under growing conditions that lack a significant electromagnetic field.

13. The method of claim 8, further comprising:
    promoting, through the electromagnetic field, growth of the plant to a maximum growth level greater than a typical maximum growth level, wherein the plant has a typical maximum growth level under growing conditions that lack a significant electromagnetic field.

14. The method of claim 8, further comprising:
    promoting, through the electromagnetic field, growth of the plant to a maximum yield greater than a typical maximum yield, wherein the plant has a typical maximum yield under growing conditions that lack a significant electromagnetic field.

* * * * *